(12) United States Patent
Barker

(10) Patent No.: US 7,731,240 B2
(45) Date of Patent: Jun. 8, 2010

(54) PIPE COUPLING

(75) Inventor: Malcolm Thomas Barker, Lakefield (ZA)

(73) Assignee: Amidex Coupling Systems (Pty) Ltd, Kya Sands (ZA)

( * ) Notice: Subject to any disclaimer, the term of this patent is extended or adjusted under 35 U.S.C. 154(b) by 331 days.

(21) Appl. No.: 11/658,675

(22) PCT Filed: Jul. 21, 2005

(86) PCT No.: PCT/IB2005/002109

§ 371 (c)(1),
(2), (4) Date: Jan. 29, 2007

(87) PCT Pub. No.: WO2006/013422

PCT Pub. Date: Feb. 9, 2006

(65) Prior Publication Data

US 2009/0001713 A1    Jan. 1, 2009

(30) Foreign Application Priority Data

Jul. 28, 2004   (ZA)   ................................. 2004/6020

(51) Int. Cl.
*F16L 17/00* (2006.01)
(52) U.S. Cl. ....................................... 285/106; 285/323
(58) Field of Classification Search ................. 285/306, 285/34, 106, 100, 920, 323, 322, 105, 96
See application file for complete search history.

(56) References Cited

U.S. PATENT DOCUMENTS

| | | | | |
|---|---|---|---|---|
| 3,142,500 A | * | 7/1964 | Wesseler | ...................... 285/96 |
| 3,600,010 A | | 8/1971 | Downs, III et al. | |
| 3,704,033 A | * | 11/1972 | Arnold | ........................ 285/322 |
| 3,713,675 A | * | 1/1973 | White, Jr. | ..................... 285/322 |
| 3,843,167 A | * | 10/1974 | Gronstedt | ...................... 285/18 |
| 4,433,859 A | * | 2/1984 | Driver et al. | ................. 285/920 |
| 4,667,986 A | * | 5/1987 | Johnson et al. | .............. 285/920 |
| 4,761,023 A | * | 8/1988 | Troxell, Jr. | .................... 285/18 |
| 4,880,257 A | * | 11/1989 | Holbert, Jr. | .................. 285/920 |
| 4,902,044 A | * | 2/1990 | Williams et al. | ............. 285/920 |
| 5,456,501 A | * | 10/1995 | Reaux | ........................... 285/96 |
| 5,911,447 A | * | 6/1999 | Ball | ............................. 285/105 |
| 6,447,018 B1 | * | 9/2002 | Ball | ............................. 285/96 |
| 7,063,356 B2 | * | 6/2006 | Barker | .......................... 285/96 |
| 2004/0051315 A1 | | 3/2004 | Barker | |

* cited by examiner

*Primary Examiner*—Aaron M Dunwoody
(74) *Attorney, Agent, or Firm*—Buchanan Ingersoll & Rooney PC

(57) ABSTRACT

A pipe coupling for joining together the ends of two adjacent pipes includes a housing for receiving the ends of the two adjacent pipes, and a locking arrangement which includes an annular chamber, and a plurality of grippers radially moveable towards the central axis of the housing from an inoperative condition to an operative condition. Each gripper includes a gripping formation for operatively gripping a pipe inserted into a bore of the housing, and a locking formation for operatively engaging a corresponding locking formation on the housing so as to axially lock the gripper to the housing. Each locking arrangement also includes a locking ring for locking the grippers to the housing so that axial displacement of the locking ring under fluid pressure within the annular chamber causes radial displacement of the grippers into the operative condition.

13 Claims, 4 Drawing Sheets

PIPE COUPLING

BACKGROUND OF THE INVENTION

This invention relates to a pipe coupling. More specifically, the invention relates to a coupling which is designed to join together two adjacent pipes for conveying fluid under pressure.

Various different types of pipe couplings are known. Many of the known types of couplings include bolts or other similar fasteners which have to be installed in a particular manner or sequence, and this tends to complicate the installation of these couplings. In practice, users often fail to comply fully with the correct installation procedure with the result that these couplings are not always installed with maximum effectiveness. Furthermore, conventional pipe couplings often allow for movement of adjacent pipes within the coupling, i.e. they are not end restraining, and this can lead to weeping at the joint over time.

It is an object of the present invention to provide an alternative pipe coupling which is relatively easy to install, which does not include any bolts or other similar fasteners, and which is fully end restraining.

SUMMARY OF THE INVENTION

According to the invention there is provided a pipe coupling for joining together the ends of two adjacent pipes, the coupling including a housing which defines a generally central bore along a central axis of the housing for receiving the ends of the two adjacent pipes, and a locking arrangement at each end of the housing for locking the pipes to the coupling, each locking arrangement including:
  an annular chamber within the housing;
  an inlet for allowing fluid into the chamber;
  an annular seal which is arranged to move within the annular chamber axially of the housing;
  a plurality of grippers which are radially moveable towards the central axis of the housing from an inoperative condition to an operative condition, each gripper including a gripping formation for operatively gripping a pipe inserted into the bore of the housing, and a locking formation for operatively engaging a corresponding locking formation on the housing so as to axially lock the gripper to the housing; and
  at least one locking element between the annular seal and the grippers for locking the grippers to the housing and to a pipe end within the housing, the or each locking element including a sloping inner surface which is engageable with a corresponding sloping outer surface on at least one of the grippers so that axial displacement of the at least one locking element under fluid pressure within the annular chamber causes radial displacement of the grippers into the operative condition, axially locking the grippers to the housing and clamping the pipe end within the housing.

For each gripper, the gripping formation may form part of a first gripping component and the locking formation may form part of a second gripping component, wherein the first and second gripping components are displaceable relative to one another.

Typically, the coupling includes elastomeric seals which are operatively deformed by the grippers to seal between the pipe ends and the housing.

In a preferred embodiment of the invention, each locking arrangement includes an outlet for allowing fluid out of the annular chamber.

In a particularly preferred arrangement, a grease nipple is attached or attachable to each chamber inlet and a pressure release mechanism is attached or attachable to each chamber outlet. In this way, grease can be introduced into each of the annular chambers under pressure with a grease gun or other similar device until the pressure within each chamber reaches a predetermined magnitude, typically slightly higher than the pressure required to effect locking of the grippers to the pipe ends.

Each locking element may comprise a locking ring which defines a tapered inner surface for engaging the grippers.

The locking formation on each gripper may comprise a locking projection which is arranged to nest within a locking recess in the housing or to locate adjacent a corresponding locking projection on the housing.

Preferably, the housing includes an inner portion which defines an outwardly projecting rim, and the locking projections on the grippers are arranged to slide radially into locking engagement with the outwardly projecting rim.

BRIEF DESCRIPTION OF THE DRAWINGS

The invention will now be described in more detail, by way of example only, with reference to the accompanying drawings in which.

DETAILED DESCRIPTION OF THE INVENTION

Figure 1:
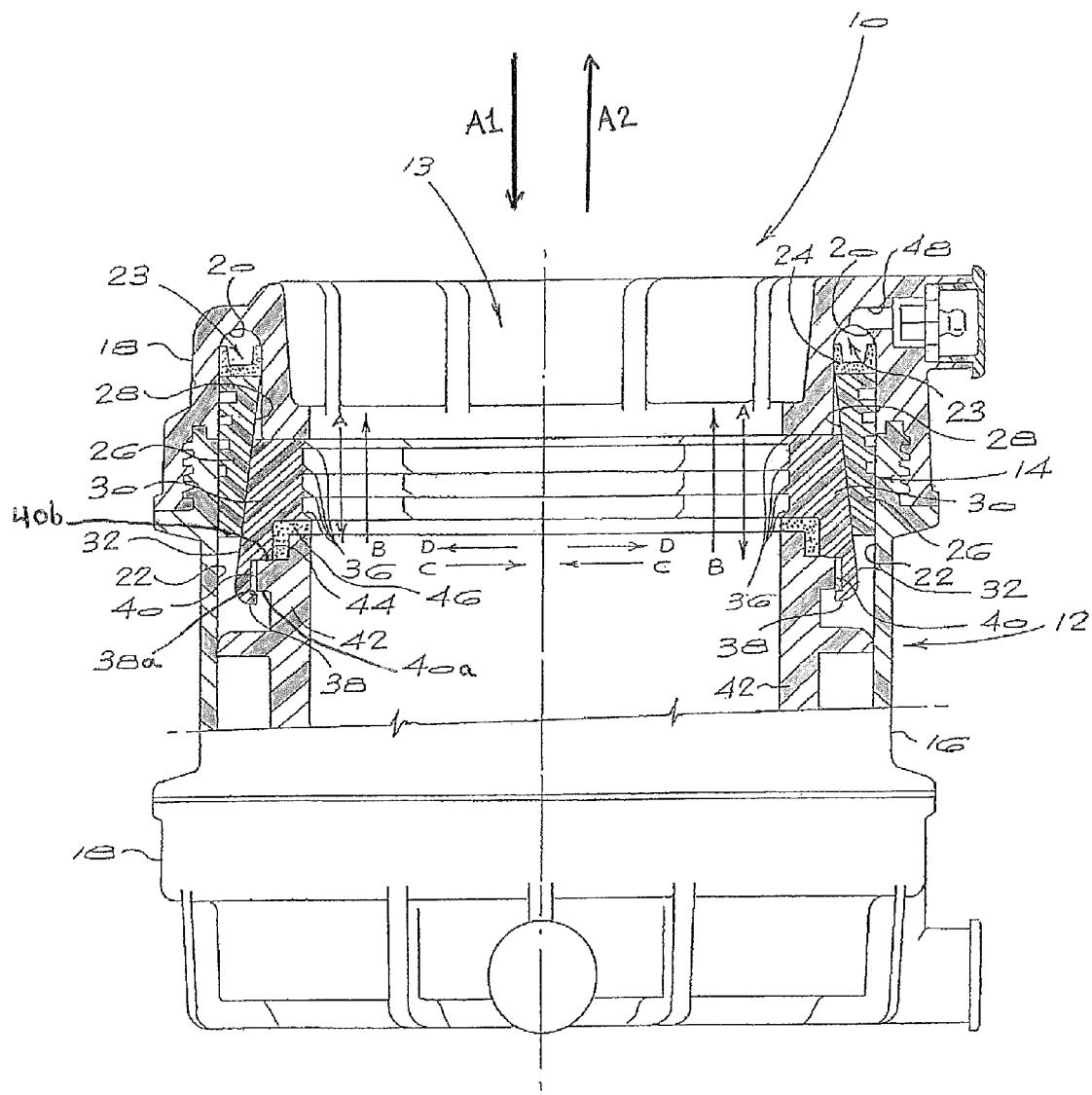
FIG. 1 shows a partially cut-away side view of a pipe coupling according to one embodiment of the present invention in an inoperative condition.
Figure 2:
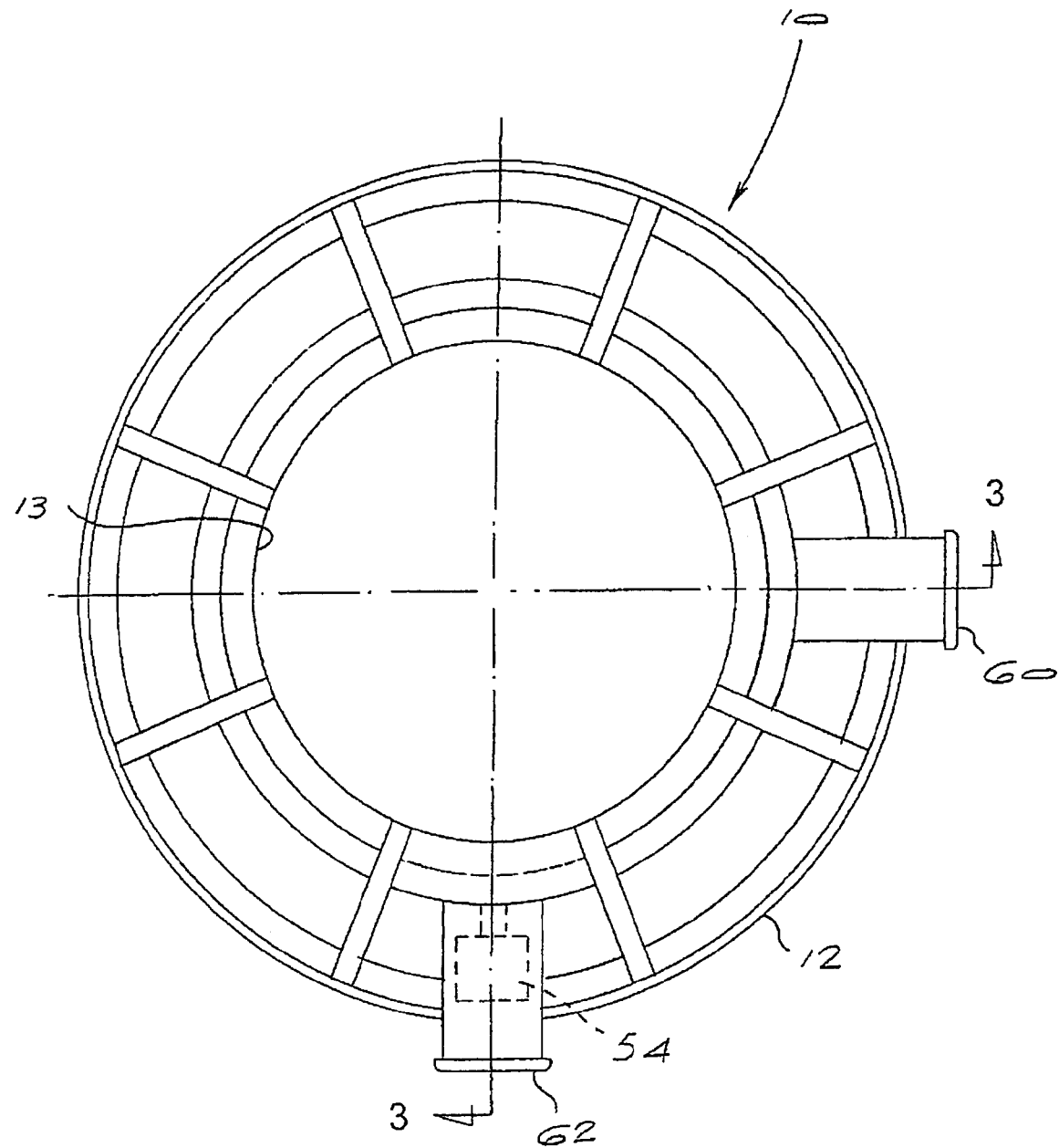
FIG. 2 shows an end view of the pipe coupling of the invention.

The coupling 10 illustrated in FIGS. 1 and 2 of the drawings is designed to join together two adjacent pipes (not shown) for conveying fluid under pressure. In the illustrated embodiment, the coupling 10 is formed from a plastics material, typically a reinforced polymer, and includes a housing 12 defining a central bore 13 for receiving the ends of the pipes, and a locking arrangement 14 at each end of the housing (only one of which is visible in the drawings). Each pipe is inserted in an axial inward direction A1 and removed in an axial outward direction A2.

The housing 12 consists of a central body portion 16 and two end caps 18 which are threaddedly engageable with the central body, as shown. Each end cap 18 includes an annular opening 20 which is alignable with an opening 22 in the body 16 to form an annular chamber 23 within the housing.

The reference numeral 24 designates an annular, dynamic hydraulic seal which is movable axially relative to the housing 12 in the directions of the arrows A and B. Also movable in the directions of the arrows A and B is a locking ring 26 which defines a tapered inner surface 28. Four grippers 30 are arranged around the bore 13 so as to be movable radially within the housing in the directions of the arrows C and D. Each gripper 30 defines a sloping outer surface 32 which is designed to engage a portion of the tapered inner surface 28 on the locking ring 26. Each gripper 30 also includes a gripping formation in the form of three sharpened ribs 36 which form teeth for gripping the end of a pipe inserted into the bore 13, and a locking formation in the form of a projection 38 which has an axially outwardly facing surface 38a arranged to engage an axially inwardly facing surface 40b formed on a radially outwardly projecting rim 40 on an inner portion 42 of the housing 12 for axially locking the gripper to the housing. The axially outwardly facing surface 38a forms the axially inner end of a radially inwardly open recessed area of the locking formation which, in turn, is defined by a groove having an axially inwardly facing surface 40b which faces the surface 38a and contacts the rim 40. A recessed portion 44 in each gripper 30 defines a seat for a circumferential, elastomeric seal 46 which is designed to seal between the pipe end and the housing, in use.

Figure 3:
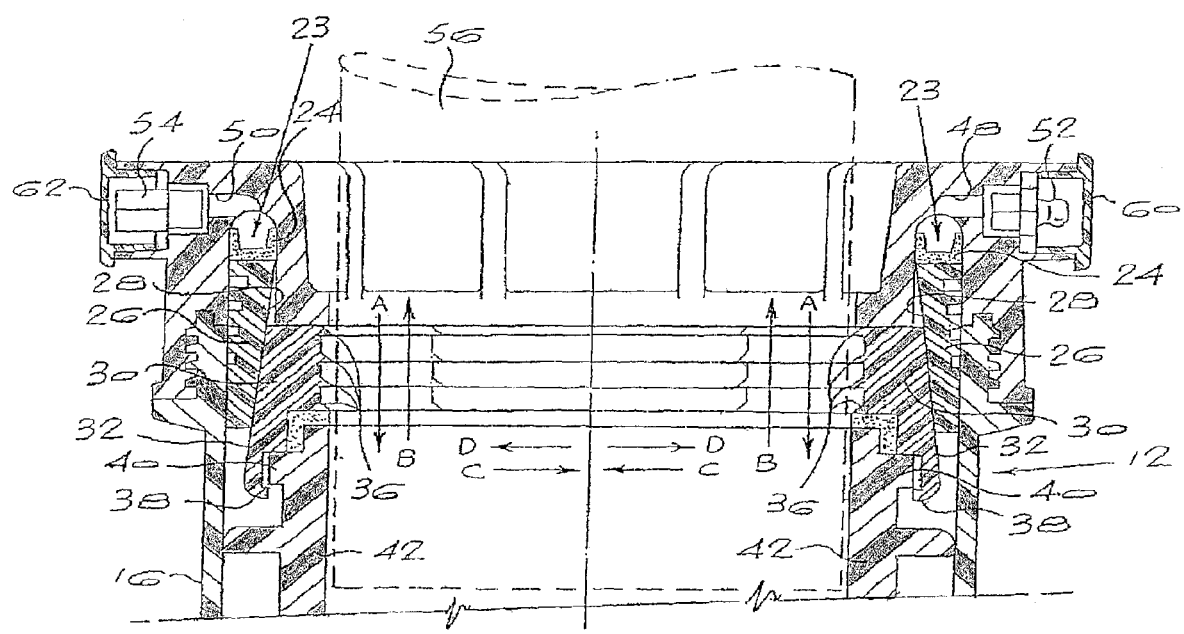
FIG. 3 shows a cross-sectional view along the line 3-3 in FIG. 2 with the coupling in an inoperative condition.

With particular reference to FIG. 3 of the drawings, an inlet 48 leads into each annular chamber 23 and an outlet 50 leads out of each annular chamber. As can be seen, the coupling 10 includes a grease nipple 52. In the inlet 48 for allowing grease to be introduced into the chamber 23 with a grease gun or other similar device (not illustrated), and a pressure release mechanism 54 in the outlet 50 for allowing grease to exit the chamber 23 when the pressure within this chamber reaches a predetermined magnitude.

In practice, the coupling 10 is used to join together the ends of two adjacent pipes 56. Only one of the pipes 56 is shown in FIG. 3, but it will be appreciated that a similar pipe is connected to the other end of the coupling in a fashion similar to that described immediately below.

Figure 4:
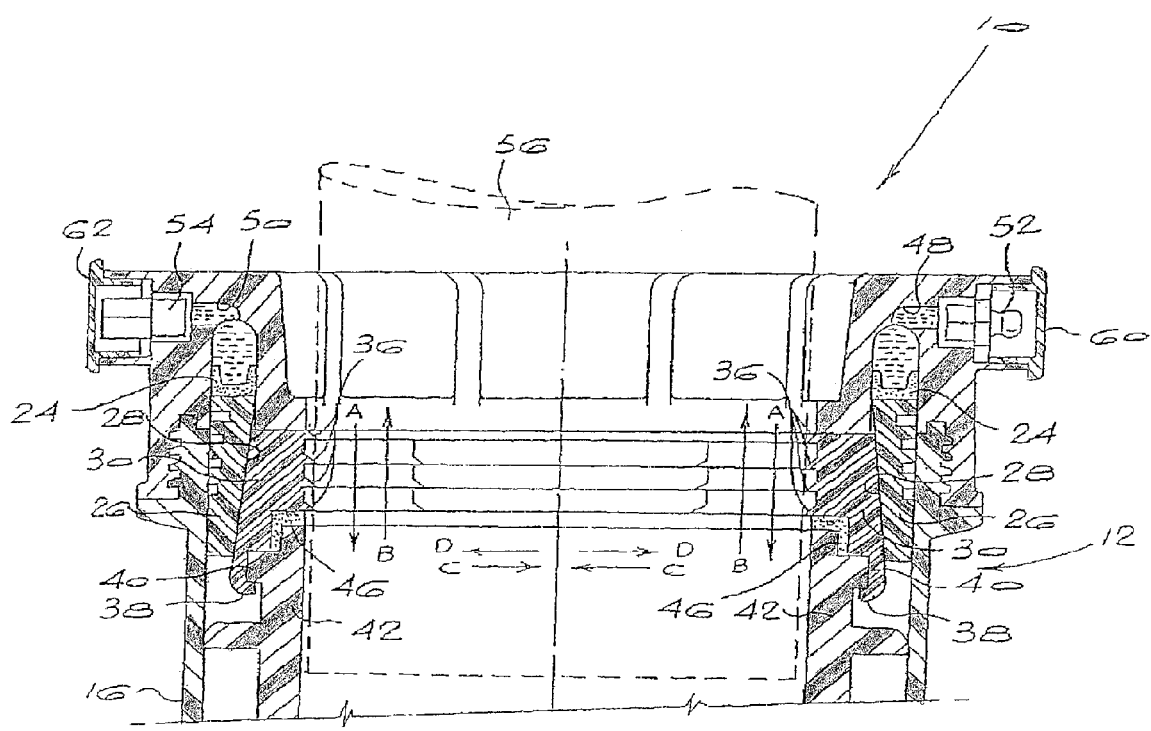
FIG. 4 shows a view similar to that of FIG. 3 with the coupling In an operative condition.

First, the end of one of the pipes 56 is inserted into the bore 13 so as to extend to a central region of the housing 12, as illustrated in FIG. 3. A conventional grease gun (not shown) is then connected to the grease nipple 52 and actuated so as to introduce grease into the annular chamber 23 via the inlet 48. Where it is not practical to use a grease gun, for example on relatively long pipelines, a device capable of releasing grease at a faster rate would typically be used. As the grease enters the chamber 23, it first fills this chamber and then applies hydraulic pressure to the seal 24 so as to drive this seal and hence the locking ring 26 in the direction of the arrow A in FIG. 3. As the locking ring is displaced in the direction of the arrow A, its tapered surface 28 interacts with the surfaces 32 on the grippers 30 so as to drive the grippers radially inwardly in the direction of the arrows C, from an inoperative condition which is illustrated in FIG. 3 to an operative condition which is illustrated in FIG. 4. In the operative condition, the locking formations 38 locate adjacent the outwardly projecting rim 40 on the inner portion 42 of the housing 12, as shown, to axially lock the grippers to the housing, and the gripping formations 36 engage the end of the pipe 56 to clamp the pipe within the coupling. The inward movement of the grippers 30 also deforms the seal 46 to form a seal between the end of the pipe 56 and the housing 12.

The pressure release mechanism 54 is designed to release grease from the chamber 23 when the pressure in the chamber reaches a predetermined pressure at which the grippers 30 are firmly clamped to the end of the pipe 56 and are locked in position by the locking ring 26. In this condition, the locking ring is firmly wedged between the grippers 30 and the housing 12. The friction forces between the grippers and the locking ring hold the locking ring in position so that it is not necessary to maintain the predetermined pressure within the chamber 23. This is advantageous because the pressure can then attenuate with no adverse effect on the integrity and efficiency of the coupling. In the illustrated embodiment, the pressure release mechanism 54 includes a diaphragm or membrane (not shown) which is designed to rupture at a predetermined pressure within the annular chamber 23 so as to release pressure from this chamber once the grippers 30 have been displaced into the operative condition.

When the pipe 56 has been locked in the coupling 10 in the manner described above, protective covers 60 and 62 are placed over the grease nipple 52 and the pressure release mechanism 54 to protect these, in use. Thereafter, the other pipe is inserted into the opposite end of the coupling 10 so as to butt against the end of the pipe 56 and the coupling is locked to the pipe in a similar manner to that described above.

In another, non-illustrated embodiment of the invention, the grippers each comprise a first gripping component which includes the gripping formation and a second gripping component which includes the locking formation. In this embodiment of the invention, the first and second gripping components may be displaceable relative to one another.

It should be appreciated that the coupling 10 does not require complicated installation procedures and is easily installed on site, without it being necessary for a user to understand how the coupling works, by merely feeding the end of a pipe into the coupling and subsequently introducing grease into the coupling housing through the grease nipple 52 until the grease is discharged through the pressure release mechanism 54.

It will also be appreciated that, when the pipe 56 is used to convey fluid under pressure, loads are transferred from the pipe 56 to the central body portion 16 of the housing 12 both via the threaded connection between the end cap 18 and the central body portion 16, and via engagement between the locking formations 38 on the grippers 30 and the rim 40 on the central body portion 16. Apart from distributing the load transfer into the central portion 16 of the housing 12, by spreading the loads between the threaded portion and the rim 40 of the body portion 16, the housing 12 is capable of resisting relatively high pull-out loads from the pressurised pipe 56.

It will be appreciated further that the coupling of the invention is essentially a one-piece unit with no loose parts that can be misplaced or lost on site. Also, the fact that there are no bolts or other similar fasteners on the coupling means that the difficulties associated with the proper installation of conventional couplings with bolts, which often requires fastening in a particular manner and/or sequence, is avoided.

Another feature of the coupling of the invention is that it is fully end restraining thereby eliminating movement in the joint area and possible weeping of the joint over time.

Yet another advantage of the coupling according to the invention is that it automatically aligns the butted pipe ends so as to reduce turbulence at the joint.

The coupling has the further advantage of producing a uniform clamping force over the entire circumference of the pipe end which deforms out of round plastics pipe ends into circular shape.

The invention claimed is:

1. A pipe coupling for joining together the ends of two adjacent pipes, the coupling including a body portion having opposite open ends each adapted to receive a respective end cap, said body portion defining a generally central bore along a central axis of the coupling for receiving the ends of the two adjacent pipes in respective open ends of the bore, and a locking arrangement for locking each pipe to the coupling, wherein each pipe is to be inserted into a respective open end of the bore in an axial inward direction and removed from that open end of the bore in an axial outward direction, each locking arrangement including:

an annular chamber;
an inlet for allowing fluid into the chamber;
an annular seal which is arranged to move within the annular chamber axially of the coupling;
a plurality of grippers which are disposed adjacent respective open ends of the bore and radially moveable towards the central axis of the coupling from an inoperative condition to an operative condition, each gripper including a gripping formation arranged, in the operative condition of the gripper, for operatively gripping a pipe inserted into the bore of the body portion, and for releasing the pipe in the inoperative condition of the gripper, and a locking formation including a radially inwardly open recessed area in the gripper into which a radially outwardly projecting portion of the body portion extends, the recessed area including an axially outwardly facing surface facing toward the respective open end of the bore and arranged to move generally radially toward the central axis into axially facing locking relationship with an axially inwardly facing surface of the projecting portion of the body portion, in the operative condition of the gripper, to axially lock the gripper to the body portion wherein the body portion opposes forces tending to pull the gripper from the respective open end of the bore, and to move generally radially away from the central axis out of said axially facing locking relationship in the inoperative condition of the gripper; and at least one locking element between the annular seal and the grippers for locking the grippers to the body portion and to a pipe end within the body portion, the or each locking element including a sloping inner surface which is engageable with a corresponding sloping outer surface on at least one of the grippers so that axial displacement of the at least one locking element under fluid pressure within the annular chamber causes radial displacement of the grippers into the operative condition, axially locking the grippers to the body portion and clamping the pipe end within the body portion.

2. A pipe coupling according to claim 1, wherein, for at least one of the grippers, a first gripping component includes the gripping formation and a second gripping component includes the locking formation, and the first and second gripping components are displaceable relative to one another.

3. A pipe coupling according to claim 1, including elastomeric seals which are operatively deformed by the grippers to seal between the pipe ends and the body portion in the operative condition of the gripper.

4. A pipe coupling according to claim 1, wherein each locking arrangement includes an outlet for allowing fluid out of the annular chamber.

5. A pipe coupling according to claim 4, wherein a grease nipple is attached or attachable to each chamber inlet, and a pressure release mechanism is attached or attachable to each chamber outlet.

6. A pipe coupling according to claim 1, wherein each locking element comprises a locking ring which defines a tapered inner surface for engaging the grippers.

7. A pipe coupling according to claim 1, wherein the projecting portion of the body is formed by a radially outwardly projecting rim, and the recessed area is formed in a locking projection arranged to move radially inwardly to create said axially facing locking relationship.

8. A pipe coupling according to claim 1 further including end caps threadedly connected to respective axial ends of the body portion, each end cap including a portion engaging an axial outer end of the respective gripper.

9. A pipe coupling according to claim 1 wherein the recessed area is formed in a flexible projection arranged to be flexed generally radially by the locking element.

10. A pipe coupling according to claim 1, wherein the recessed area is defined by a groove formed in the locking formation, the groove including an axially inwardly facing surface facing toward the axially outwardly facing surface.

11. A pipe coupling for joining together the ends of two adjacent pipes, the coupling including a housing formed by a body portion and a pair of end caps threaded onto respective open axial ends of the body portion, the body portion defining a generally central bore along a central axis of the housing for receiving the ends of the two adjacent pipes, and a locking arrangement at each end of the housing for locking the pipes to the coupling, wherein each pipe is to be inserted into a respective open end of the bore in an axial inward direction and removed from that open end of the bore in an axial outward direction, each locking arrangement including:

an annular chamber within the housing and formed between portions of the body portion and the respective end cap;

an inlet for allowing fluid into the chamber;

an annular seal which is arranged to move within the annular chamber axially of the coupling;

a plurality of grippers disposed adjacent respective open ends of the bore and each having an axially outer end engaged by a respective end cap and being radially moveable towards the central axis of the housing from an inoperative condition to an operative condition, each gripper further including:

a gripping formation arranged, in the operative condition of the gripper, for operatively gripping a pipe inserted into the bore of the body portion, and for releasing the pipe in the inoperative condition of the gripper, and a locking formation including a radially inwardly open recessed area in the gripper into which a radially outwardly projecting portion of the body portion extends, the recessed area including an axially outwardly facing surface facing toward the respective open end of the bore and arranged to move generally radially toward the central axis into axially facing locking relationship with an axially inwardly facing surface of the projecting portion of the body portion wherein the body portion opposes forces tending to pull the gripper from the respective open end of the bore, in the operative condition of the gripper, to axially lock the gripper to the housing, and to move generally radially away from the central axis out of said axially facing locking relationship in the inoperative condition of the gripper; and at least one locking element between the annular seal and the grippers for locking the grippers to the body portion and to a pipe end within the body portion, the or each locking element including a sloping inner surface which is engageable with a corresponding sloping outer surface on at least one of the grippers so that axial displacement of the at least one locking element under fluid pressure within the annular chamber causes radial displacement of the grippers into the operative condition, axially locking the grippers to the body portion and clamping the pipe end within the body portion.

12. A pipe coupling according to claim 11 wherein the recessed area is formed in a flexible projection arranged to be flexed generally radially by the locking element.

13. A pipe coupling according to claim 11, wherein the recessed area is defined by a groove formed in the locking groove, the groove including an axially inwardly facing surface facing toward the axially outwardly facing surface.

* * * * *